United States Patent [19]

Sidhu et al.

[11] Patent Number: 4,539,612
[45] Date of Patent: Sep. 3, 1985

[54] SPINDLE BEARING ASSEMBLY FOR DISK DRIVE UNIT

[76] Inventors: Pawitter S. Sidhu, 2900 Corda La., Bel Air, Calif. 90049; Gary M. Delgado, 1745 Carmelina Ave., Los Angeles, Calif. 90025

[21] Appl. No.: 427,598

[22] Filed: Sep. 29, 1982

[51] Int. Cl.³ .................... G11B 5/016; G11B 5/012
[52] U.S. Cl. .......................................... 360/99; 360/97
[58] Field of Search ................................ 360/97–99, 360/86, 132, 137, 135; 346/137; 474/90; 242/197, 198, 199, 200

[56] References Cited

U.S. PATENT DOCUMENTS 4,040,107  8/1977  Bryer ............................... 360/99
4,139,876  2/1979  Owens ............................. 360/97
4,193,102  3/1980  Beuch ............................. 360/99
4,345,284  8/1982  Saito ............................. 360/132
4,452,408  6/1984  Sasaki ............................ 242/199

Primary Examiner—Robert M. Kilgore
Attorney, Agent, or Firm—Evanns & Walsh

[57] ABSTRACT

A disk drive assembly having a shallow or low profile construction. The assembly includes a drive spindle and drive cone for the diskette. The drive cone is mounted directly from a part of the frame or chassis of the assembly. The drive spindle is cylindrical having a bottom which is dished or raised upwardly providing a bottom recess. The bushing which contains the journal bearings for the spindle shaft extends into the recess so that overall dimension of the assembly is minimized.

7 Claims, 3 Drawing Figures

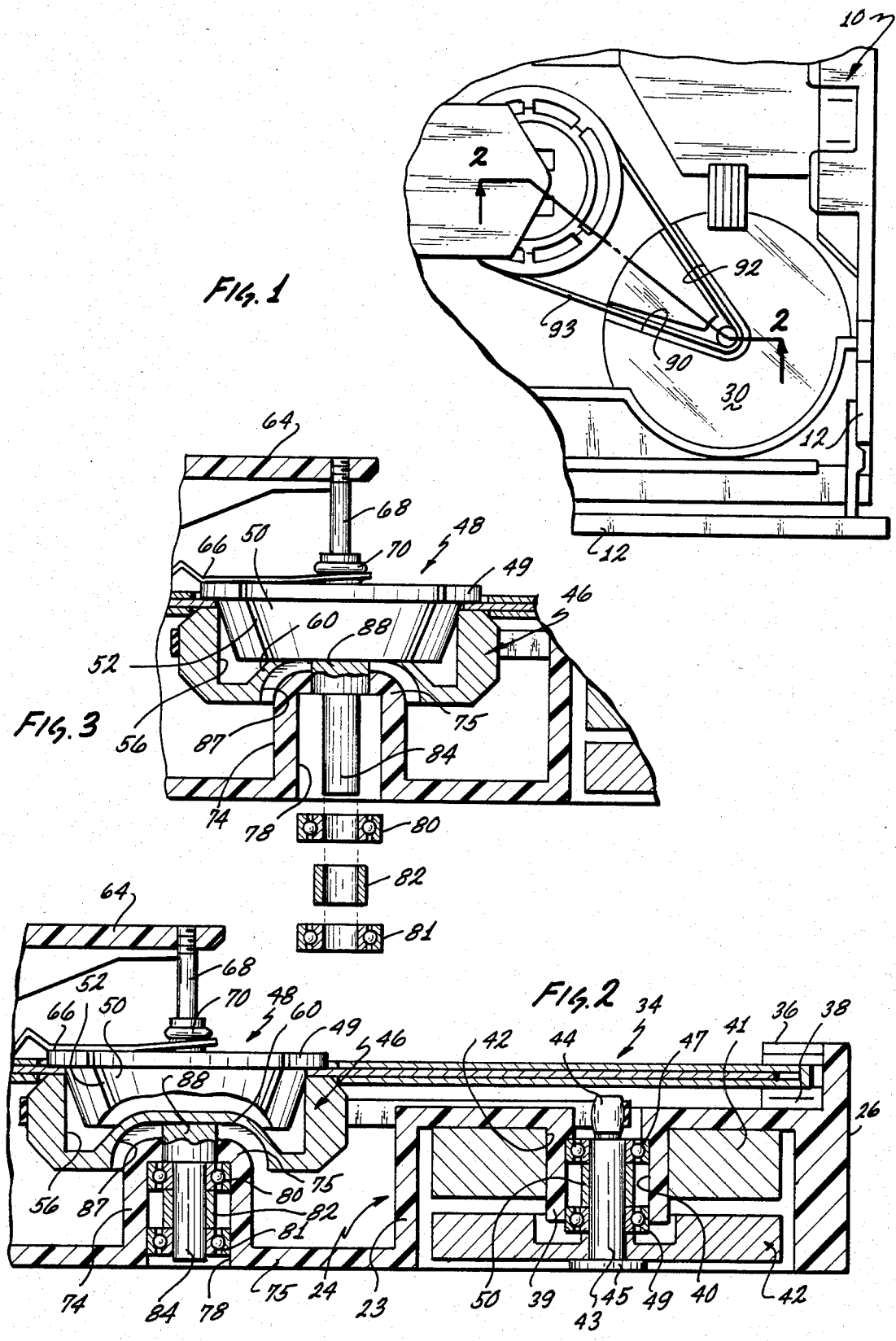

SPINDLE BEARING ASSEMBLY FOR DISK DRIVE UNIT

BACKGROUND OF THE INVENTION

1. Field of the Invention

The field of the invention is primarily that of floppy disk drive assemblies. The invention relates to this type of equipment wherein the drive unit, that is, the chassis or frame of the unit is constructed to be relatively shallow, that is, to have a low profile. The invention is particularly directed to a spindle and spindle bearing support structure adapted to a shallow low profile frame.

2. Description of the Prior Art

In disk drive units or assemblies typically, of course, there is a driving member or drive spindle which is driven by a motor and with which a clutch cone cooperates for holding and driving the diskette while it is in the unit. Certain units of this type are particularly adapted for use in mini and micro computers. Contemporarily designed units may be substituted for units already present in previously marketed mini and/or micro computers.

Recent developements have resulted in satisfactory designs of shallow, that is, low profile chassis units whereby two of them can be placed in a space formerly occupied by a single one, thereby doubling the capacity of the computer.

One of the difficulties or draw backs to previous designs of drive units has been one of space required by the fact that typically the drive motor for the spindle was mounted coaxially with it, that is, below it thereby increasing the depth of the unit as a whole by that amount.

Associated with the difficulty described above is that of the problem of minimizing the overall dimension of the drive spindle, its bearing mounting and the drive cone so as to be compatible with a shallow low profile unit. In a typical construction in which the drive spindle and motor are mounted coaxially on the same shaft, bearing supports are required for the shaft which tends further to increase the overall vertical dimension. The prior art has been further lacking in a type of construction of a spindle drive cone and bearing mounting, having the capabilities of the herein invention.

The herein invention is concerned primarily with the spindle construction and its bearing mounting, a specific example of which is described in detail hereinafter. It is intended that the invention shall fill the existing needs not presently available in the prior art and to accomplish a number of other advantages.

SUMMARY OF THE INVENTION

As previously pointed out the invention is concerned primarily with a spindle and bearing construction adapted for drive of the spindle and consequently the disk or diskette or a disk drive assembly.

In the preferred form of the invention the spindle and its bearing are mounted in a drive unit chassis or frame which is shallow, that is, of low profile and which is of molded construction with a motor housing integrally molded into the housing. This construction is shown in greater detail in application Ser. No. 06/427,600 filed Sept. 29, 1982 and owned by a common assignee.

The drive spindle is of a particular construction. It has a cylindrical bore to receive the drive cone in frictional relationship for driving the spindle.

The bottom part of the spindle is domed upwardly so that it extends into the interior of the drive cone when the parts are in driving position. The domed part of the bottom of the drive spindle provides a recess in its lower side. An integral bushing extends upwardly from the bottom of the frame of the unit. The top of this bushing is domed so as to extend into the recess in the bottom of the spindle. The spindle includes an integral shaft which is journalled in bearings positioned in the bore of the same bushing. The bore of the bushing is large enough to receive spaced bearings for journalling the shaft of the spindle with a spacer sleeve in between the bearings.

By this unique construction the overall dimension of the spindle, the drive cone, and support bearing assembly is reduced contributing to the realization of a unit of low profile, that is, one that is smaller so as to occupy less space when assembled in a micro or mini computer. The motor itself is of shallow construction, as described in detail in the co-pending application referred to and it is mounted in a position spaced laterally from the drive spindle.

In the light of the foregoing the primary object of the invention is to provide or make available an improved spindle and bearing mounting having a relatively small vertical dimension which is particularly adapted for drive of the spindle in a disk drive assembly unit.

A further object is to realize a construction as in the foregoing object wherein the drive spindle is cylindrical having a cylindrical bore having a raised bottom part providing a bottom recess; a bushing provided the domed upper part of which extends into the recess, the bushing being of a size to accommodate bearings journalling a shaft for the drive cone, which extends from the bottom of the spindle whereby the overall dimension is minimized.

A further object is to realize a construction as in the foregoing wherein the raised portion in the bottom of the drive spindle can extend upwardly into the drive cone when the parts are in driving relationship.

Further objects and advantages will be apparent from the following detailed description and annexed drawings.

BRIEF DESCRIPTION OF THE DRAWINGS

FIG. 1 is a partial view of a part of the frame or chassis of a disk drive assembly showing the drive of the spindle from the motor by way of a belt;

FIG. 2 is a section view taken along the line 2—2 of FIG. 1;

FIG. 3 is an exploded cross section view showing a part of the chassis frame, the mounting for the spindle and the drive cone.

DESCRIPTION OF A PREFERRED EMBODIMENT AND BEST MODE OF PRACTICE

Referring to the figures of the drawings numeral 10 designates a part of a frame or chassis which may preferably be of integral molded construction molded from a conductive plastic as described more in detail in application Ser. No. 06/427,600 filed Sept. 29, 1982 having common ownership. At the front of the chassis 10 is a bezel 12 having a slot (not shown) to receive the diskette. The bezel preferably has a snap on construction by way of slots in side walls of the chassis 10 as shown in detail in the application previously referred to.

The chassis 10 as stated is molded integrally and it includes an integral molded motor housing which is identified by the numeral 24 which forms a skirt 23 which extends downwardly from a surface of the chassis adjacent to a wall 26 as shown in FIG. 2. The top of the motor housing is identified at 30 in FIG. 1.

The diskette is identified by the numeral 34 in FIG. 2. As stated the diskette is inserted through the slot in the bezel 12 and its edges fit between the guides at the sides of the chassis, two of such guides being shown at 36 and 38 in FIG. 2.

The driving motor itself is identified by the numeral 90 in the figure. It is mounted in the integral housing 24 previously described, the interior of which is identified by the numeral 23. The top 30 of the housing 24 has a central depending bushing 39 which has a bore 40.

Mounted in the top of the integral housing 24 is the stator of the motor which is identified by the numeral 41. It is, of course, circular having angularly spaced magnetic poles with conventional windings associated with each pole and carried in the radial slots between poles. The stator 41 has a central opening or bore 42 and it is mounted on the bushing 39, which extends downwardly from the top 30 within the integral housing 24. The stator 41 itself is of relatively shallow construction.

The rotor of the motor is identified by the numeral 42. It can be made in two parts or it can be made as a single piece as shown in FIG. 2 which embodies a lower part which is a metal disk, the upper of which is in the form of a ring shaped permanent magnet. The rotor is mounted on a shaft 43 the upper end of which is turned or machined as identified at 44, so as to be able to receive a belt as a coupling. At the end of the shaft 43 and below the rotor 42 is a disk 45.

The shaft 45 is journalled in the bore 40 of the bushing 39 in the two bearings identified at 47 and 49 with a spacer sleeve 50 between them.

From the foregoing, it can be seen that the motor itself is of shallow construction, that is, low profile to accommodate its assembly in the integral housing 24 in the low profile chassis 10. The rotor with its shaft is held in position relative to the to the stator 41 by the magnetism in the permanent magnet of the rotor.

The drive spindle for the diskette is identified at 46. It drives a drive cone as identified at 48, which includes a top disk 49 and lower conical part 50 which has angularly spaced slits in it as identified at 52. The conical part 50 is received in the cylindrical bore 56 in the drive spindle 46 as may be seen in FIG. 2.

In the lower part of the drive spindle 56 is a raised part or boss 60, which will be referred to presently.

The drive cone 48 is carried on the end of an arm 64 to which is attached an actuating spring 66 the end of which is bifurcated and which straddles a stem 68 at the end of the arm 64. There is a holder 70 on the stem just above the bifurcated end of the actuation spring 66, which is attached to the arm 64.

Numeral 74 designates a bushing upstanding from the bottom 75 of the frame or chassis 10 and integral therewith, the bushing 74 having a bore 78.

The drive spindle 46 is integral with a shaft or stem 84 which extends through bore 78 in the bushing 74. It is journalled in the bearings 80 and 81 which are spaced by a sleeve 82, in the bore 78 and held by way of a retaining ring 85 at the end of the spindle shaft.

As will be understood, in operation the drive cone 48 is moved into and out of engagement with bore 56 in the drive spindle 46 for driving the diskette, the center hole of which is clamped between the disk 49 on the drive cone 48 and the driving spindle 46.

The boss 60 in the drive spindle 46 is raised as shown and its underside is recessed as shown at 87. The upper part of the shaft 84 is integral with the bushing 88 on the underside of the bottom of the spindle 46. The upper part of the bushing 74 is domed as shown at 75 so as to extend into the recess 87. The construction makes it possible to decrease the overall dimension to accommodate to the low profile construction and also in order to make the bushing 74 long enough to accommodate the spaced bearings 80 and 81.

From the foregoing it will be observed that the bottom of the spindle 46 is domed so as to extend inside of the cone 48 when the parts are in driving relationship.

The underside of the dome in the bottom of the spindle 46 provides a recess and the domed top of the bushing 74 can extend into this recess. With this construction the bushing 74 is of sufficient extent to accommodate the bearings 80 and 81 and the spacer 82 for the shaft 84 on which the spindle is carried. It is to be seen therefore that the unique construction is one that minimizes the vertical dimension making it possible to achieve a shallow, low profile construction as described in the foregoing.

The top 30 of the integral housing 24 has slots 90 and 92 in it. Numeral 93 designates a belt forming a coupling between the end part 44 of the shaft 43 and the spindle 46. No separate pulley is required for the spindle 46 since the body of the spindle itself receive the coupling member 93. As observed the motor is mounted laterally with respect to the driving spindle 46 rather than coaxially with it to accommodate to the low profile shallow construction.

From the foregoing those skilled in the art will readily understand the nature of the construction of the invention and the manner in which the objects as set forth in the foregoing are realized. All of the construction is low profile. The motor is not coaxial with the drive spindle, but is spaced laterally so as to accommodate the low profile construction.

As explained, the spindle is of unique construction having a bottom part which is raised and which can extend up into the driving cone, thus, providing a bottom recess so that the bushing for the support bearings journalling the spindle shaft can extend or protrude up into the recess. In this way the overall dimension is minimized and yet the bushing is large enough to accommodate the speced bearings in which the spindle shaft is journalled.

The foregoing disclosure is representative of a preferred form of the invention and is to be interpreted in an illustrative rather than a limiting sense the invention to be accorded the full scope of the claims appended hereto.

We claim:

1. As an article of manufacture, in a low profile floppy disk drive unit, in combination, a chassis frame, the frame having a bottom, a cylindrical disk drive spindle, a drive cone cooperable with the spindle, the spindle having an upwardly dished bottom part extendable into the cone, the dished part providing a recess below it, a bushing positioned coaxially with the axis of the spindle and cone, the upper part of the bushing extending into the said recess, a shaft for the spindle coaxial with the said bushing and bearing means in the bushing journalling the said shaft.

2. An article as in claim 1, wherein the bushing has a bore of larger diameter then the shaft, first and second bearings positioned in the said bore journalling the shaft and spacer means between the said bearings.

3. An article as in claim 1, wherein the upper end of said bushing is domed and contoured to extend into the recess in the said part of the spindle.

4. An article as in claim 3, wherein the upper part of the bushing has an aperture in it, the said bottom part of the spindle including an integral part fitting in the opening in the said bushing.

5. As an article of manufacture, in a floppy disk drive unit, in combination, a cylindrical disk drive spindle, a drive cone cooperable with the spindle, the spindle having a shaft, support means for the shaft directly below the spindle, the said support means including a bushing member having a bore and a bearing means within the bore in which the shaft is journaled, the spindle having a recess in its bottom part, the bushing member having a part extending upwardly into the said recess.

6. An article as in claim 5, wherein the upper part of the bushing means is domed and contoured so as to be able to extend into the recess in said spindle.

7. An article as in claim 5, wherein the bottom part of the said spindle forming the said recess is configurated to extend upwardly into the cone when the part are in driving relationship.

* * * * *